US011972892B2

(12) United States Patent
Annen

(10) Patent No.: US 11,972,892 B2
(45) Date of Patent: Apr. 30, 2024

(54) COIL COMPONENT

(71) Applicant: Murata Manufacturing Co., Ltd., Kyoto-fu (JP)

(72) Inventor: Kazunori Annen, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 643 days.

(21) Appl. No.: 17/137,186

(22) Filed: Dec. 29, 2020

(65) Prior Publication Data

US 2021/0210273 A1 Jul. 8, 2021

(30) Foreign Application Priority Data

Jan. 7, 2020 (JP) ................................ 2020-000974

(51) Int. Cl.

*H01F 27/29* (2006.01)
*H01F 27/24* (2006.01)
*H01F 27/28* (2006.01)
*H01F 41/04* (2006.01)

(52) U.S. Cl.

CPC ......... *H01F 27/2804* (2013.01); *H01F 27/24* (2013.01); *H01F 27/29* (2013.01); *H01F 41/041* (2013.01); *H01F 2027/2809* (2013.01)

(58) Field of Classification Search

CPC ...... H01F 27/2804; H01F 27/24; H01F 27/29; H01F 2027/2809; H01F 27/292; H01F 27/306; H01F 17/0013

See application file for complete search history.

(56) References Cited

U.S. PATENT DOCUMENTS

| | | | | |
|---|---|---|---|---|
| 8,710,947 B2 * | 4/2014 | Wada | H01F 17/04 | 336/83 |
| 8,810,350 B2 * | 8/2014 | Seko | H01F 27/292 | 336/200 |
| 9,196,669 B2 * | 11/2015 | Yang | H01L 28/10 | |
| 9,362,043 B2 * | 6/2016 | Kido | H01F 27/24 | |
| 9,601,259 B2 * | 3/2017 | Ozawa | H01F 27/292 | |
| 2014/0266547 A1 * | 9/2014 | Watanabe | H01F 41/042 | 336/200 |
| 2015/0091685 A1 * | 4/2015 | Kitajima | H01F 17/0013 | 29/602.1 |
| 2017/0207018 A1 * | 7/2017 | Jung | H01F 5/00 | |

FOREIGN PATENT DOCUMENTS

| | | | |
|---|---|---|---|
| CN | 103703524 | A | 4/2014 |
| JP | 2003-309021 | A | 10/2003 |
| JP | 2013-031880 | A | 2/2013 |
| JP | 2013-089640 | A | 5/2013 |
| JP | 5673837 | B2 | 2/2015 |
| JP | 2016-058753 | A | 4/2016 |
| JP | 2018-78189 | A | 5/2018 |
| JP | 6394846 | B1 | 9/2018 |
| WO | 2013/031880 | A1 | 3/2013 |

* cited by examiner

*Primary Examiner* — Mang Tin Bik Lian
(74) *Attorney, Agent, or Firm* — Studebaker & Brackett PC

(57) ABSTRACT

A first substrate have recesses respectively provided at corner portions of a bottom surface. Outer electrodes each have electrode body portion provided around an associated one of the recesses on the bottom surface. The electrode body portion has a protruding portion extending along a short-side ridge portion between the bottom surface and a side surface.

21 Claims, 11 Drawing Sheets

COIL COMPONENT

CROSS-REFERENCE TO RELATED APPLICATION

This application claims benefit of priority to Japanese Patent Application No. 2020-000974, filed Jan. 7, 2020, the entire contents of which is incorporated herein by reference.

BACKGROUND

Technical Field

The present disclosure relates to a coil component.

Background Art

Hitherto, electronic components are mounted on various electronic devices. For example, a laminated coil component is known as one of the electronic components, as described, for example, International Publication No. 2013-031880. In the coil component of International Publication No. 2013-031880, recesses are formed at four corners on the bottom surface of a substrate, and outer electrodes are provided at the recesses. Each of the outer electrodes is made up of a plurality of metal layers.

Incidentally, in the above-described coil component, the recesses are provided at the four corners of the bottom surface of the substrate, and, when the coil component is connected to a mounting substrate, solder enters into the recesses. A distance to other electronic components on the mounting substrate can be reduced by the amount of entry of solder in the recesses. However, when solder enters into the recesses of the coil component and, as a result, the amount of entry of solder between the coil component and the mounting substrate increases, stress easily concentrates on portions where solder has entered when high temperature treatment is performed in solder mounting process or the like. Thus, there are concerns about occurrence of a fracture or the like of the substrate. In this way, there remains room for improvement in terms of reliability.

SUMMARY

Accordingly, the present disclosure provides a coil component capable of contributing to improvement in reliability.

According to preferred embodiments of the present disclosure, a coil component includes a magnetic substrate having a rectangular bottom surface having a pair of long sides and a pair of short sides, a top surface located across from the bottom surface, and a plurality of side surfaces each connecting the bottom surface and the top surface, a multilayer body having an electrically insulating layer formed on the top surface and a coil formed in the electrically insulating layer, and an outer electrode provided on the bottom surface. The magnetic substrate has a recess provided at a corner portion of the bottom surface, the outer electrode has an electrode body portion provided around the recess on the bottom surface, and the electrode body portion has a protruding portion extending along a ridge portion between the bottom surface and one of the side surfaces.

With this configuration, since the electrode body portion has the protruding portion extending along the ridge portion between the bottom surface and one of the side surfaces, it is possible to restrict the amount of entry of solder with the protruding portion, so a contact area between the magnetic substrate and solder at the ridge portion is reduced. Thus, stress concentration that occurs at the recesses when high temperature treatment is performed in solder mounting process or the like is reduced.

Other features, elements, characteristics and advantages of the present disclosure will become more apparent from the following detailed description of preferred embodiments of the present disclosure with reference to the attached drawings.

DETAILED DESCRIPTION

Hereinafter, an embodiment will be described with reference to the accompanying drawings.

The accompanying drawings may illustrate components in a magnified view for the sake of easy understanding. The scale ratio of components may be different from actual ones or those in other drawings.

Figure 1:
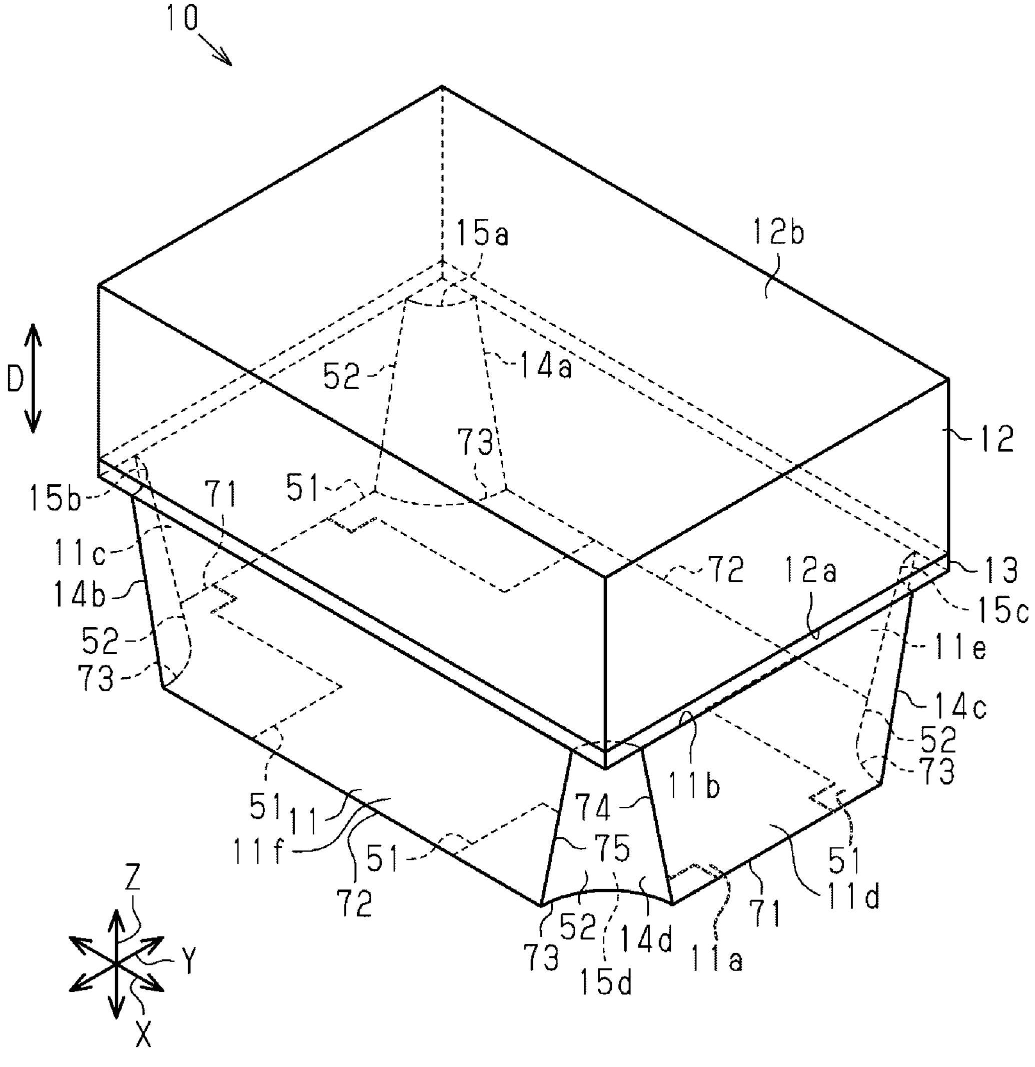
FIG. 1 is a perspective view of a coil component according to an embodiment.

As shown in FIG. 1, a coil component 10 has a substantially rectangular parallelepiped shape. The coil component 10 includes a first substrate 11, a second substrate 12, a multilayer body 13, and outer electrodes 14*a*, 14*b*, 14*c*, 14*d*. The first substrate 11 and the second substrate 12 are laminated so as to sandwich the multilayer body 13.

In FIG. 1, a lamination direction D of the first substrate 11, the multilayer body 13, and the second substrate 12 in the coil component 10 is defined as Z-axis direction, and a direction in which the long sides of the coil component 10 extend is defined as X-axis direction and a direction in which the short sides of the coil component 10 extend is defined as Y-axis direction when viewed in the Z-axis direction. In the Z-axis direction, a side where the outer electrodes 14*a* to 14*d* of the coil component 10 are present is defined as lower side, and a side across from the lower side is defined as upper side.

Figure 2:
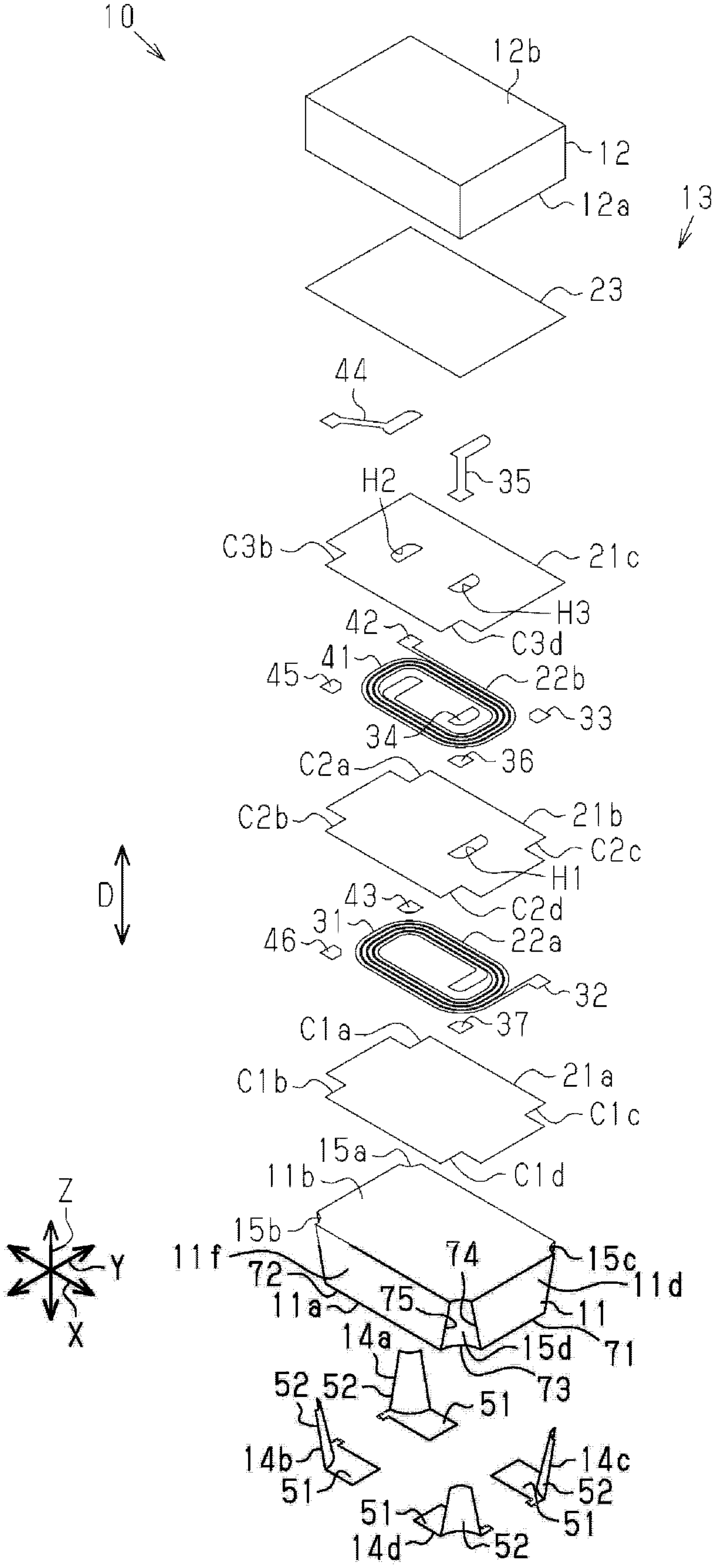
FIG. 2 is an exploded perspective view of the coil component according to the embodiment.

As shown in FIG. 1 and FIG. 2, the first substrate 11 has a substantially sheet shape. The first substrate 11 has a substantially rectangular bottom surface 11*a* and a top surface 11*b* located across from the bottom surface 11*a*. The top surface 11*b* faces the multilayer body 13 in the Z-axis direction, and the bottom surface 11*a* faces away from the multilayer body 13 in the Z-axis direction.

As shown in FIG. 1, the first substrate 11 has two side surfaces 11*c*, 11*d* connecting the bottom surface 11*a* and the top surface 11*b* and facing in the X-axis direction, and two side surfaces 11*e*, 11*f* connecting the bottom surface 11*a* and the top surface 11*b* and facing in the Y-axis direction. The two side surfaces 11*c*, 11*d* facing in the X-axis direction face away from each other. The two side surfaces 11*e*, 11*f* facing in the Y-axis direction face away from each other. The first substrate 11 has short-side ridge portions 71 and long-side ridge portions 72. One of the short-side ridge portions 71 is between the bottom surface 11*a* and the side surface 11*c*, and the other one of the short-side ridge portions 71 is between the bottom surface 11*a* and the side surface 11*d*. One of the long-side ridge portions 72 is between the bottom surface 11*a* and the side surface 11*e*, and the other one of the long-side ridge portions 72 is between the bottom surface 11*a* and the side surface 11*f*.

Here, in this specification, the "substantially rectangular shape" includes such a shape that at least one of the four corner portions of the substantially rectangular shape is cut out. In other words, in the bottom surface 11*a* serving as a bottom surface, such a shape of the bottom surface 11*a* that four corner portions each formed by extending the short-side ridge portion 71 and the long-side ridge portion 72 are cut out in a substantially circular arc shape toward the center of the bottom surface 11*a* is also included in the substantially rectangular shape. The shape of the first substrate 11 may be regarded as a substantially rectangular parallelepiped shape having the substantially rectangular bottom surface 11*a*.

The first substrate 11 has recesses 15*a*, 15*b*, 15*c*, 15*d* recessed toward the center of the first substrate 11 at the four corner portions when viewed in a direction perpendicular to the bottom surface 11*a*. In other words, each of the recesses 15*a*, 15*b*, 15*c*, 15*d* provides a substantially circular arc ridge portion 73 at the bottom surface 11*a* and is formed such that the diameter of the circular arc gradually reduces toward the top surface 11*b*.

The first substrate 11 is a magnetic substrate. An example of the magnetic substrate is a ferrite sintered body. The first substrate 11 may be a resin molded body containing magnetic powder. The magnetic powder is, for example, ferrite or a metal magnetic material, such as iron (Fe), silicon (Si), and chromium (Cr), and the resin material is, for example, a resin material, such as epoxy. When the first substrate 11 is a resin containing magnetic powder, it is desirable that magnetic powder is adequately dispersed in a resin when two or three types of magnetic powder having different particle size distributions are mixed.

As shown in FIG. 2, the multilayer body 13 includes a plurality of electrically insulating layers 21*a* to 21*c*, coils 22*a*, 22*b*, and an adhesion layer 23, laminated on the top surface 11*b* of the first substrate 11. In the multilayer body 13, the direction in which the electrically insulating layers 21*a* to 21*c*, the coils 22*a*, 22*b*, and the adhesion layer 23 are laminated coincides with the lamination direction D and the Z-axis direction. The multilayer body 13 may be configured such that, for example, there is no interlayer interface or no other interface between the electrically insulating layers 21*a* to 21*c*.

As shown in FIG. 2, the electrically insulating layers 21*a* to 21*c* are laminated so as to be arranged in order of the electrically insulating layer 21*a*, the electrically insulating layer 21*b*, and the electrically insulating layer 21*c* from the first substrate 11 side in the Z-axis direction. The electrically insulating layers 21*a* to 21*c* have substantially the same size as the top surface 11*b* of the first substrate 11. The electrically insulating layer 21*a* has cutout portions C1*a* to C1*d* at four corners. The electrically insulating layer 21*b* has cutout portions C2*a* to C2*d* at four corners. The electrically insulating layer 21*b* has a via hole H1 extending through in the Z-axis direction. Among the four corners of the electrically insulating layer 21*c*, cutout portions C3*b*, C3*d* are provided at both end portions at one side in the Y-axis direction. The electrically insulating layer 21*c* has via holes H2, H3 extending through in the Z-axis direction.

The cutout portion C1*a* and the cutout portion C2*a* are provided at positions that overlap the outer electrode 14*a* in the Z-axis direction. The cutout portion C1*b*, the cutout portion C2*b*, and the cutout portion C3*b* are provided at positions that overlap the outer electrode 14*b* in the Z-axis direction. The cutout portion C1*c* and the cutout portion C2*c* are provided at positions that overlap the outer electrode 14*c* in the Z-axis direction. The cutout portion C1*d*, the cutout portion C2*d*, and the cutout portion C3*d* are provided at positions that overlap the outer electrode 14*d* in the Z-axis direction.

The electrically insulating layers 21*a* to 21*c* may be made by using various resin materials, such as polyimide resin, epoxy resin, phenolic resin, and benzocyclobutene resin. The coil 22*a* includes a coil conductor 31 and extended portions 32, 33, 34, 35, 36, 37.

The coil conductor 31 is provided between the electrically insulating layer 21*a* and the electrically insulating layer 21*b* and has a substantially flat spiral shape that approaches the center while winding in a clockwise direction when viewed in plan from the upper side in the Z-axis direction. The center of the coil conductor 31 coincides with the center of the coil component 10 when viewed in plan in the Z-axis direction.

The extended portion 32 is connected to an outer end portion of the coil conductor 31. The extended portion 32 is extended to the cutout portion C1*c* of the electrically insulating layer 21*a*. The extended portion 32 extends through the electrically insulating layer 21*a* in the Z-axis direction via the cutout portion C1*c*. The extended portion 32 is extended to the cutout portion C2*c* of the electrically insulating layer 21*b* and is connected to the extended portion 33 provided at the cutout portion C2*c*.

The thus configured extended portion 32 is connected to the end portion of the coil conductor 31 and is extended to the cutout portion C1*c* of the electrically insulating layer 21*a* that makes up the multilayer body 13. Thus, the extended portion 32 is exposed to the recess 15*c* when viewed in plan from the lower side toward the upper side in the Z-axis direction.

The extended portion 34 extends through the electrically insulating layer 21*b* in the Z-axis direction via the via hole H1, thus being connected to an inner end portion of the coil conductor 31. The extended portion 35 is connected to the extended portion 34 such that a first end side extends through the electrically insulating layer 21*c* in the Z-axis direction via the via hole H3. A second end side of the extended portion 35 is extended to the cutout portion C3*d* of the electrically insulating layer 21*c*. The extended portion 35 extends through the electrically insulating layer 21*c* in the Z-axis direction via the cutout portion C3*d*.

The extended portion 36 is provided at the cutout portion C2*d* of the electrically insulating layer 21*b*. Thus, the extended portion 36 is connected to the second end side of the extended portion 35. The extended portion 36 extends through the electrically insulating layer 21*b* in the Z-axis direction via the cutout portion C2*d*.

The extended portion 37 is provided at the cutout portion C1*d* of the electrically insulating layer 21*a*. Thus, the extended portion 37 is connected to the extended portion 36. The extended portion 37 extends through the electrically insulating layer 21*a* in the Z-axis direction via the cutout portion C1*d*.

The thus configured extended portion 34 to 37 are connected to the end portion of the coil conductor 31 and are extended to the cutout portion C1*d* of the electrically insulating layer 21*a* that makes up the multilayer body 13. Thus, the extended portion 37 is exposed to the recess 15*d* when viewed in plan from the lower side toward the upper side in the Z-axis direction.

The coil 22*b* includes a coil conductor 41 and extended portions 42, 43, 44, 45, 46. The coil conductor 41 is provided between the electrically insulating layer 21*b* and the electrically insulating layer 21*c* and has a substantially flat spiral shape that approaches the center while turning in the clockwise direction when viewed from the upper side in the Z-axis direction in plan. In other words, the coil conductor 41 turns in the same direction as the coil conductor 31. The center of the coil conductor 41 substantially coincides with the center of the coil component 10 when viewed in plan in the Z-axis direction. Thus, the coil conductor 41 overlaps the coil conductor 31 when viewed in plan in the Z-axis direction.

The extended portion 42 is connected to an outer end portion of the coil conductor 41. The extended portion 42 is extended to the cutout portion C2*a* of the electrically insulating layer 21*b*. The extended portion 42 extends through the electrically insulating layer 21*b* in the Z-axis direction via the cutout portion C2*a*.

The extended portion 43 is provided at the cutout portion C1*a* of the electrically insulating layer 21*a*. Thus, the extended portion 43 is connected to the extended portion 42. The extended portion 43 extends through the electrically insulating layer 21*a* in the Z-axis direction via the cutout portion C1*a*.

The thus configured extended portions 42, 43 are connected to the end portion of the coil conductor 41 and are extended to the cutout portion C1*a*. Thus, the extended portion 43 is exposed to the recess 15*a* when viewed in plan from the lower side toward the upper side in the Z-axis direction.

A first end side of the extended portion 44 extends through the electrically insulating layer 21*c* in the Z-axis direction via the via hole H2, thus being connected to an inner end portion of the coil conductor 41. A second end side of the extended portion 44 is extended to the cutout portion C3*b* of the electrically insulating layer 21*c*. The extended portion 44 extends through the electrically insulating layer 21*c* in the Z-axis direction via the cutout portion C3*b*.

The extended portion 45 is provided at the cutout portion C2*b* of the electrically insulating layer 21*b*. Thus, the extended portion 45 is connected to the extended portion 44. The extended portion 45 extends through the electrically insulating layer 21*b* in the Z-axis direction via the cutout portion C2*b*.

The extended portion 46 is provided at the cutout portion C1*b* of the electrically insulating layer 21*a*. Thus, the extended portion 46 is connected to the extended portion 45. The extended portion 46 extends through the electrically insulating layer 21*a* in the Z-axis direction via the cutout portion C1*b*.

The thus configured extended portions 44 to 46 are connected to the end portion of the coil conductor 41 by the extended portion 44 and are extended to the cutout portion C1*b* by the extended portion 46 connected to the extended portion 44 via the extended portion 45. Thus, the extended portion 46 is exposed to the recess 15*b* when viewed in plan from the lower side toward the upper side in the Z-axis direction.

The second substrate 12 has a substantially sheet shape. The second substrate 12 has a bottom surface 12*a* and a top surface 12*b* facing away from the bottom surface 12*a*. The bottom surface 12*a* faces the multilayer body 13 in the Z-axis direction, and the top surface 12*b* faces away from the multilayer body 13 in the Z-axis direction. The second substrate 12 is, for example, a magnetic substrate as an example of a magnetic layer. The second substrate 12 is made of, for example, any one of the materials exemplified for the first substrate 11. The second substrate 12 is bonded to the top surface of the multilayer body 13 with the adhesion layer 23 interposed therebetween. For example, thermosetting polyimide resin may be used as the adhesion layer 23. The second substrate 12 may be made up of a magnetic layer other than the magnetic substrate.

Each of the outer electrodes 14*a*, 14*b*, 14*c*, 14*d* has an electrode body portion 51 and a connection portion 52 connecting the electrode body portion 51 and the coil 22*a* or the coil 22*b*. The electrode body portion 51 of each of the outer electrodes 14*a*, 14*b*, 14*c*, 14*d* is formed around an associated one of the recesses 15*a* to 15*d* on the bottom surface 11*a* of the first substrate 11. More specifically, the electrode body portion 51 of the outer electrode 14*a* is formed around the recess 15*a*. The electrode body portion 51 of the outer electrode 14*b* is formed around the recess 15*b*. The electrode body portion 51 of the outer electrode 14*c* is formed around the recess 15*c*. The electrode body portion 51 of the outer electrode 14*d* is formed around the recess 15*d*.

The connection portion 52 of each of the outer electrodes 14*a*, 14*b*, 14*c*, 14*d* is formed at an associated one of the recesses 15*a* to 15*d* of the first substrate 11. More specifically, the connection portion 52 of the outer electrode 14*a* is formed at the recess 15*a*. The connection portion 52 of the outer electrode 14*b* is formed at the recess 15*b*. The connection portion 52 of the outer electrode 14*c* is formed at the recess 15*c*. The connection portion 52 of the outer electrode 14*d* is formed at the recess 15*d*.

Figure 7:
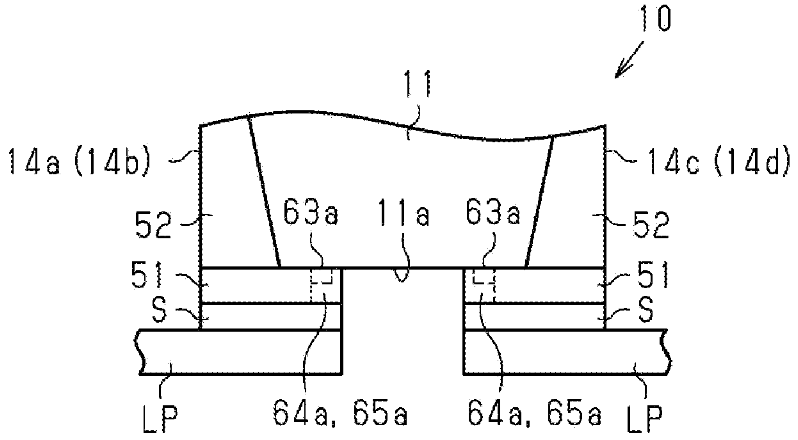
FIG. 7 is a view for illustrating an installation mode of the coil component according to the embodiment.

The outer electrodes 14*a*, 14*b*, 14*c*, 14*d* are respectively formed at the four corners of the bottom surface 11*a* that is the bottom surface of the first substrate 11. As shown in FIG. 7, the outer electrodes 14*a*, 14*b*, 14*c*, 14*d* are connected by solder S to a land pattern LP of a mounting substrate for mounting the coil component 10.

Each of the outer electrodes 14*a*, 14*b*, 14*c*, 14*d* is made so as to have a substantially rectangular shape when viewed from the lower side toward the upper side in the Z-axis direction. A short-side direction of each of the outer electrodes 14*a*, 14*b*, 14*c*, 14*d* coincides with a short-side direction of the bottom surface 11*a* of the first substrate 11. A long-side direction of each of the outer electrodes 14*a*, 14*b*, 14*c*, 14*d* coincides with a long-side direction of the bottom surface 11*a* of the first substrate 11. Here, the case in which the sides of the outer electrodes 14*a*, 14*b*, 14*c*, 14*d* are straight and the case in which the sides are slightly wavy are included. The long-side direction of each of the outer electrodes 14*a*, 14*b*, 14*c*, 14*d* does not need to coincide with the long-side direction of the bottom surface 11*a*. The short-side direction of each of the outer electrodes 14*a*, 14*b*, 14*c*, 14*d* does not need to coincide with the short-side direction of the bottom surface 11*a*.

Figure 3:
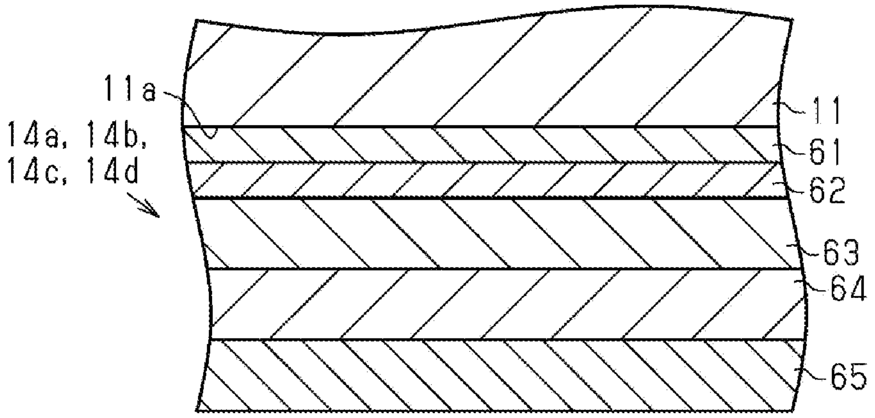
FIG. 3 is a cross-sectional view for illustrating the multilayer structure of each outer electrode of the coil component according to the embodiment.

Each of the outer electrodes 14*a*, 14*b*, 14*c*, 14*d* is made up of a plurality of laminated metal layers. As shown in FIG. 3, the plurality of metal layers includes a first metal layer 61, a second metal layer 62, a third metal layer 63, a fourth metal layer 64, and a fifth metal layer 65. Here, the connection portions 52 of the outer electrodes 14*a*, 14*b*, 14*c*, 14*d* have the same multilayer structure as the electrode body portions 51 of the outer electrodes 14*a*, 14*b*, 14*c*, 14*d*. In other words, when the electrode body portion 51 includes the first metal layer 61, the second metal layer 62, the third metal layer 63, the fourth metal layer 64, and the fifth metal layer 65, the connection portion 52 also similarly includes the first metal layer 61, the second metal layer 62, the third metal layer 63, the fourth metal layer 64, and the fifth metal layer 65.

The first metal layer 61 is provided on the bottom surface 11*a* of the first substrate 11. The first metal layer 61 is located at an innermost side of the metal layers 61 to 65 in the Z-axis direction. In other words, the first metal layer 61 corresponds to a base layer. Here, the "innermost side" means a position closest to the first substrate 11 serving as the magnetic substrate among the plurality of laminated metal layers.

The first metal layer 61 is a metal thin film containing titanium (Ti) as a main ingredient and is formed by, for example, sputtering. The first metal layer 61 has, for example, a thickness of greater than or equal to about 100 nm and less than or equal to about 200 nm (i.e., from about 100 nm to about 200 nm).

The second metal layer 62 is provided on the first metal layer 61. The second metal layer 62 is a metal thin film containing copper (Cu) as a main ingredient and is formed by, for example, sputtering. The second metal layer 62 corresponds to a first outer metal layer that covers the first metal layer 61 serving as the base layer. The second metal layer 62 has, for example, a thickness of greater than or equal to about 100 nm and less than or equal to about 200 nm (i.e., from about 100 nm to about 200 nm).

The third metal layer 63 is provided on the second metal layer 62. The third metal layer 63 is a metal film containing copper (Cu) as a main ingredient and is formed by, for example, electrolytic plating. The third metal layer 63 corresponds to a first outer metal layer that covers the first metal layer 61 serving as the base layer. The third metal layer 63 has, for example, a thickness of about 10 μm.

Figure 4:
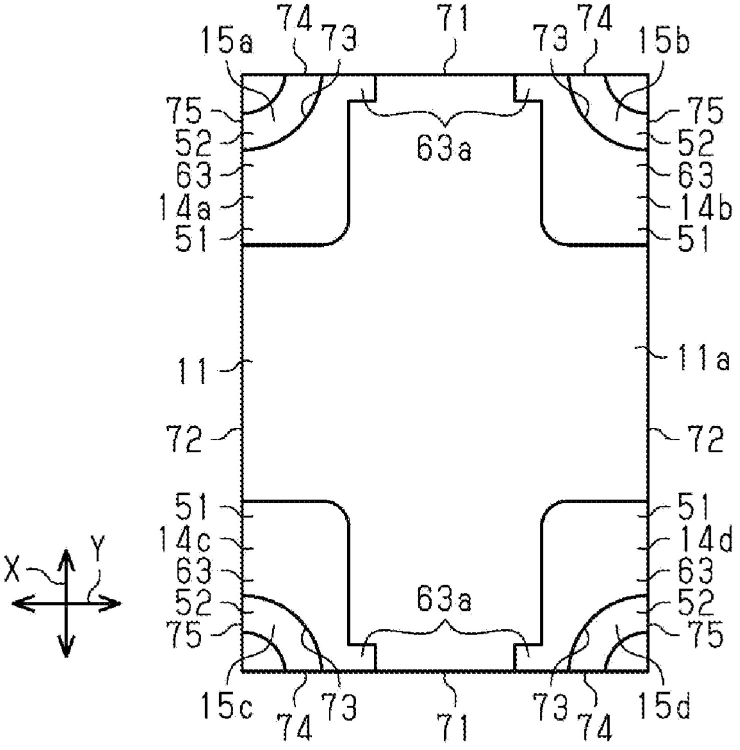
FIG. 4 is a plan view for illustrating third metal layers of the outer electrodes of the coil component according to the embodiment.

As shown in FIG. 4, the third metal layer 63 of the electrode body portion 51 is formed up to a position that overlaps the short-side ridge portion 71 of the first substrate 11. At this time, the third metal layer 63 of the electrode body portion 51 is formed up to a position that overlaps the long-side ridge portion 72 of the first substrate 11.

The third metal layer 63 of the connection portion 52 is formed so as to entirely cover the connection portion 52. At this time, the third metal layer 63 is formed up to a position that overlaps a ridge portion 74 of an associated one of the recesses 15*a* to 15*d* continuous in a direction from the short-side ridge portion 71 toward the top surface 11*b*. At this time, the third metal layer 63 is formed up to a position that overlaps a ridge portion 75 of an associated one of the recesses 15*a* to 15*d* continuous in a direction from the long-side ridge portion 72 toward the top surface 11*b*.

The third metal layer 63 has a protruding portion 63*a* that extends along the short-side ridge portion 71 of the first substrate 11 while being in contact with the short-side ridge portion 71. The protruding portion 63*a* is formed so as to extend toward the center in the Y-axis direction on the bottom surface 11*a*. In other words, in the third metal layers 63 of the outer electrodes 14*a*, 14*b* arranged in the Y-axis direction, the protruding portions 63*a* extend so as to approach each other. An elongation of the protruding portion 63*a* at the short-side ridge portion 71 is longer than or equal to about 1/100 and shorter than or equal to about 7/100 (i.e., from about 1/100 to about 7/100) of the length of the short-side ridge portion 71. The protruding portion 63*a* is longer than or equal to about 3 μm and shorter than or equal to about 21 μm (i.e., from about 3 μm to about 21 μm) along the short-side ridge portion 71.

The fourth metal layer 64 is provided on the third metal layer 63. The fourth metal layer 64 is a metal film containing nickel (Ni) as a main ingredient and is formed by, for example, electrolytic plating. The fourth metal layer 64 corresponds to a second outer metal layer provided so as to cover the third metal layer 63 that makes up the first outer metal layer.

Figure 5:
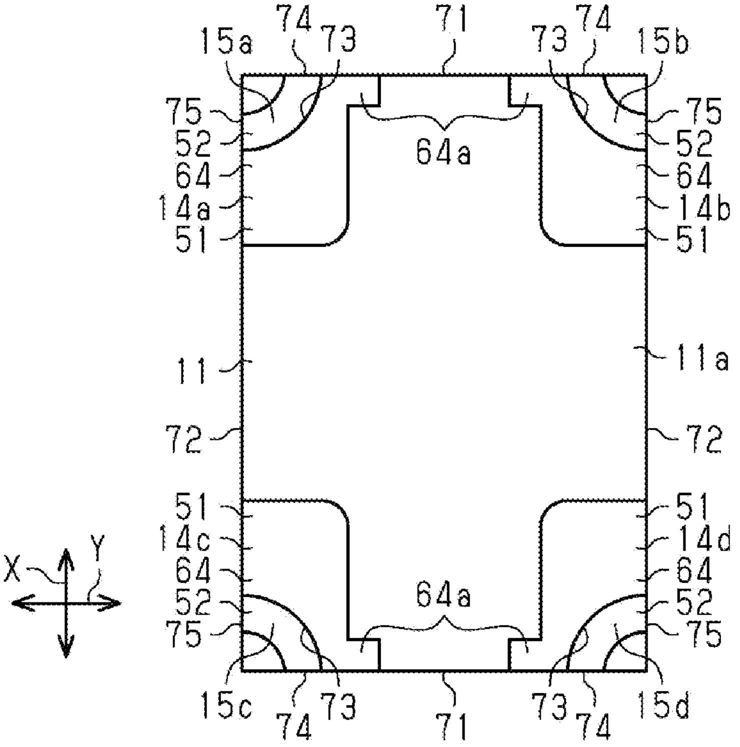
FIG. 5 is a plan view for illustrating fourth metal layers of the outer electrodes of the coil component according to the embodiment.
Figure 8:
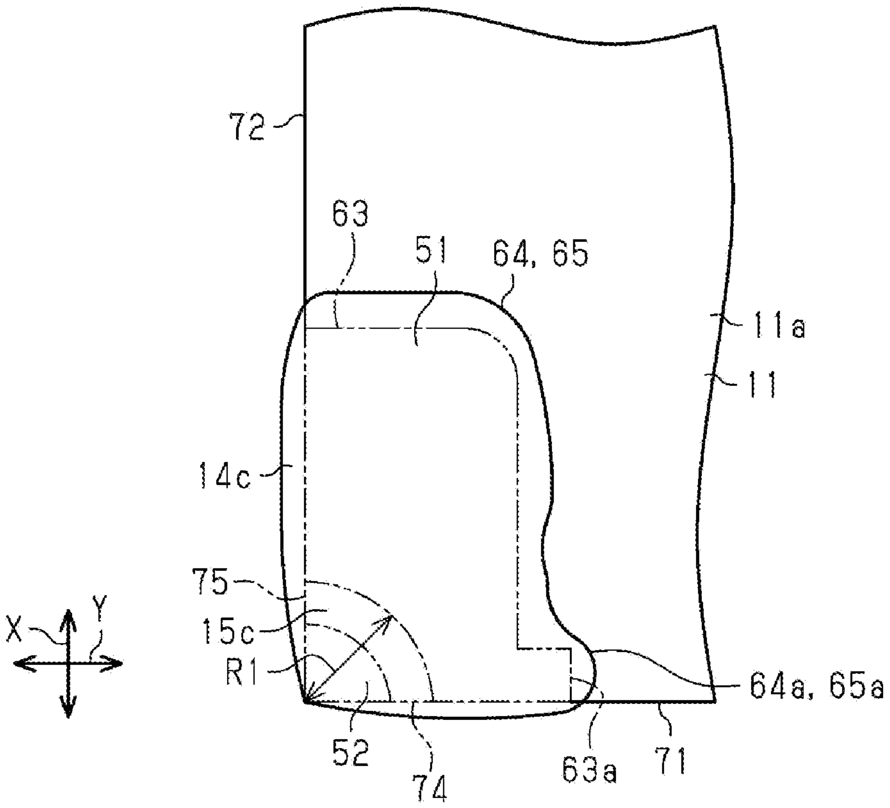
FIG. 8 is a view for illustrating the structure of each outer electrode of the coil component according to the embodiment.

As shown in FIG. 5, the fourth metal layer 64 is formed on the third metal layer 63 by electrolytic plating, so a protruding portion 64*a* is formed along the protruding portion 63*a*. As shown in FIG. 8, the protruding portion 64*a* is longer in length along the short-side ridge portion 71 (length along the Y-axis direction) than the protruding portion 63*a*. The protruding portions 64*a* shown in FIG. 5 and FIG. 8 are schematically shown and may be different from actual ones.

An elongation of the protruding portion 64*a* at the short-side ridge portion 71 is longer than or equal to about 1/50 and shorter than or equal to about 4/50 (i.e., from about 1/50 to about 4/50) of the length of the short-side ridge portion 71. The length along the short-side ridge portion 71 (length along the Y-axis direction) of the protruding portion 64*a* is greater than or equal to about 6 μm and more preferably greater than or equal to about 12 μm. However, in consideration of stress concentration on the protruding portion 64*a*, the length is preferably less than about 25 μm. The fourth metal layer 64 has, for example, a thickness of about 3 μm. The fourth metal layer 64 has a length of about 72 m in the short-side direction, and has a tolerance of about 10 μm.

The fifth metal layer 65 is provided on the fourth metal layer 64. The fifth metal layer 65 is a metal film containing tin (Sn) as a main ingredient and is formed by, for example, electrolytic plating. The fifth metal layer 65 corresponds to an outer metal layer located on the first metal layer 61 serving as the base layer as in the case of the second metal layer 62, the third metal layer 63, and the fourth metal layer 64.

Figure 6:
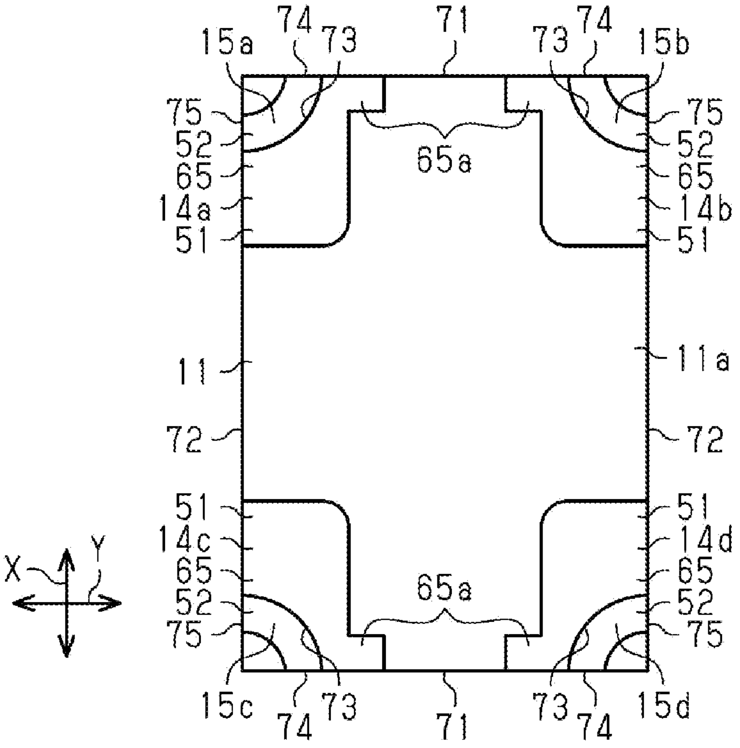
FIG. 6 is a plan view for illustrating fifth metal layers of the outer electrodes of the coil component according to the embodiment.

As shown in FIG. 6, the fifth metal layer 65 is formed on the fourth metal layer 64 by electrolytic plating, so a protruding portion 65*a* is formed along the protruding portion 64*a*. As shown in FIG. 8, the protruding portion 65*a* is longer in length along the short-side ridge portion 71 (length along the Y-axis direction) than the protruding portion 63*a*. The protruding portions 64*a* shown in FIG. 6 and FIG. 8 are schematically shown and may be different from actual ones.

The length along the short-side ridge portion 71 (length along the Y-axis direction) of the protruding portion 65*a* is greater than or equal to about 8 μm and more preferably greater than or equal to about 27 μm. However, the fifth metal layer 65 containing tin as a main ingredient is dissolved by solder S, so the influence on stress concentration is small. The fifth metal layer 65 has, for example, a thickness of about 3 μm. The fifth metal layer 65 has a length of about 75 μm in the short-side direction, and has a tolerance of about 10 μm. An elongation of the fifth metal layer 65 along the short-side ridge portion 71 is preferably less than or equal to about 13 μm.

In the thus configured coil component 10, when the first substrate 11, the multilayer body 13, and the second substrate 12 are laminated as a laminate, the laminate has a length of about 0.23 mm in the lamination direction D (Z-axial direction), a length of about 0.3 mm in the Y-axis direction that is the short-side direction among directions perpendicular to the lamination direction D, and a length of about 0.45 mm in the X-axis direction that is the long-side direction among the directions perpendicular to the lamination direction D. A tolerance of the length in each of the three axial directions is about ±0.02 mm.

As shown in FIG. 8, the recess 15*c* has a radius R1 of about 62 μm after the fourth metal layer 64 is formed, and has a tolerance of about ±15 μm. The recess 15*c* has a radius R1 of about 55 μm after the fifth metal layer 65 is formed, and has a tolerance of about ±15 μm. FIG. 8 is schematically shown, and the origin position of the radius R1 can be different from an actual one. Not limited to the radius R1 of the recess 15*c*, the other recesses 15*a*, 15*b*, 15*d* are also preferably set to the radius R1.

As shown in FIG. 7, in the thus configured coil component 10, the bottom surface 11*a* of the first substrate 11 is partially covered with the protruding portions 63*a*, 64*a*, 65*a* of the electrode body portions 51. Thus, when the coil component 10 is mounted on the land pattern LP by solder S, the amount of entry of solder S is restricted to reduce the contact of solder S with the first substrate 11.

The operation of the thus configured coil component 10 will be described below. The outer electrodes 14*a*, 14*c* are used as input terminals. The outer electrodes 14*b*, 14*d* are used as output terminals.

Differential transmission signals composed of a first signal and a second signal that are different in phase by 180 degrees are respectively input to the outer electrodes 14*a*, 14*c*. Because the first signal and the second signal are in a differential mode, the first signal and the second signal generate mutually opposite magnetic fluxes in the coils 22*a*, 22*b* when passing through the coils 22*a*, 22*b*. The magnetic flux generated in the coil 22*a* and the magnetic flux generated in the coil 22*b* cancel out each other. Therefore, in each of the coils 22*a*, 22*b*, almost no variation in magnetic flux occurs due to flow of the first signal or the second signal. In other words, the coil 22*a* or the coil 22*b* does not generate counter-electromotive force that impedes flow of the first signal or the second signal. Thus, the coil component 10 has an extremely small impedance for the first signal and the second signal.

On the other hand, when the first signal and the second signal each contain common mode noise, the common mode noises respectively generate magnetic fluxes having the same direction in the coils 22*a*, 22*b* when passing through the coils 22*a*, 22*b*. Therefore, in each of the coils 22*a*, 22*b*, magnetic flux increases due to flow of the common mode noise. Thus, each of the coils 22*a*, 22*b* generates counter-electromotive force that impedes flow of the common mode noise. Thus, the coil component 10 has a large impedance for the first signal and the second signal.

Next, a manufacturing method for the coil component 10 will be described with reference to FIG. 9 to FIG. 18.

Figure 9:
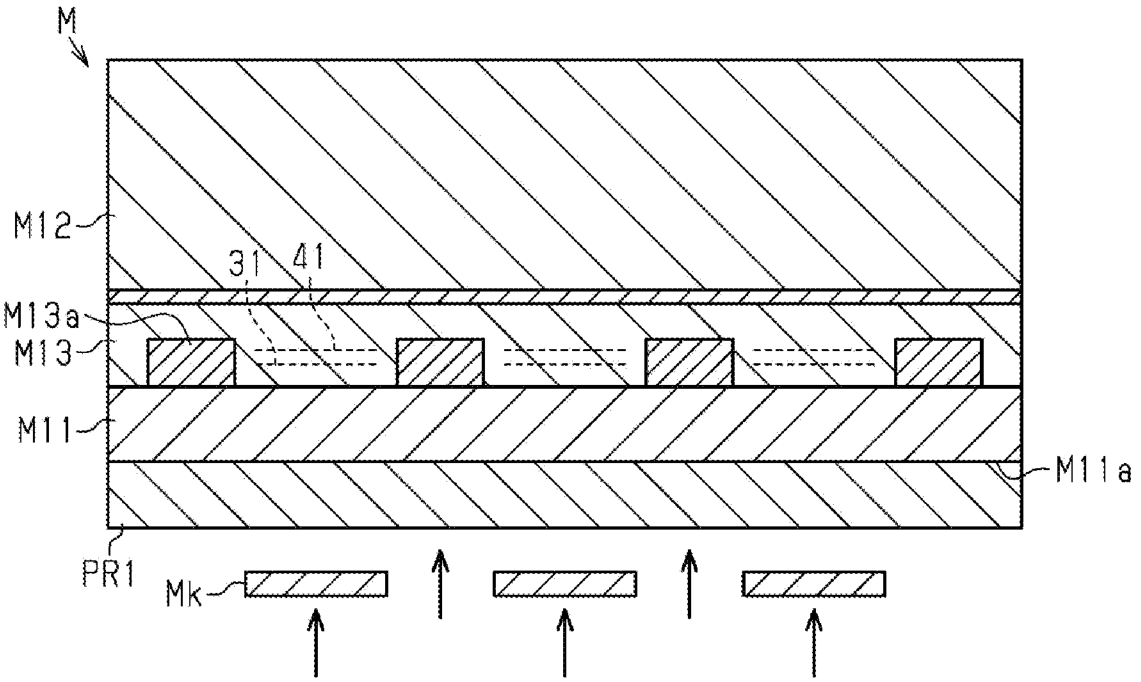
FIG. 9 is a view for illustrating a manufacturing method for the coil component according to the embodiment.

As shown in FIG. 9, positions corresponding to the recesses 15*a*, 15*b*, 15*c*, 15*d* of a photoresist PR1 on a bottom surface M11*a* of a mother substrate M11 are exposed to light while being aligned with the coil conductors 31, 41 in a mother multilayer body M13. At this time, by placing a mask Mk at portions other than the recesses 15*a* to 15*d*, the positions corresponding to the recesses 15*a*, 15*b*, 15*c*, 15*d* of the photoresist PR1 are exposed to light as described above. The mother multilayer body M13 will be the multilayer body 13, and is disposed between the mother substrate M11 that will be the first substrate 11 and a mother substrate M12 that will be the second substrate 12. Hereinafter, a body made up of the mother substrate M11, the mother substrate M12, and the mother multilayer body M13 will be described as a mother body M. The mother multilayer body M13 includes conductor portions M13*a* that will be not only the coil conductors 31, 41 but also the extended portions 32 to 37, 42 to 46.

Figure 10:
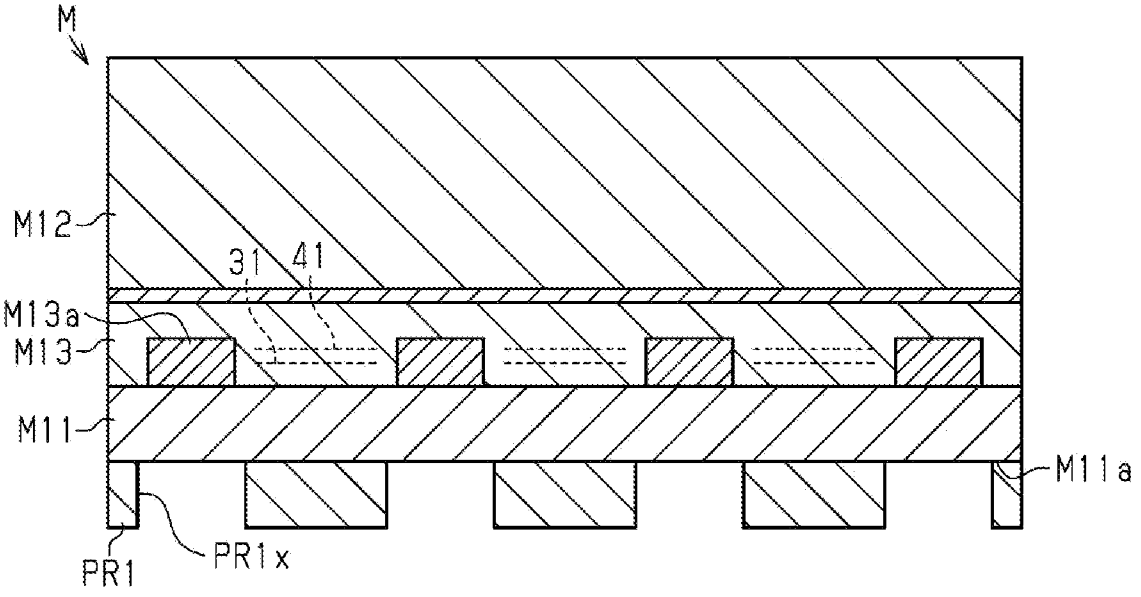
FIG. 10 is a view for illustrating the manufacturing method for the coil component according to the embodiment.

Subsequently, as shown in FIG. 10, the photoresist PR1 is developed. Thus, the photoresist PR1 has openings PR1*x* corresponding to the recesses 15*a*, 15*b*, 15*c*, 15*d* and exposed to light.

Figure 11:
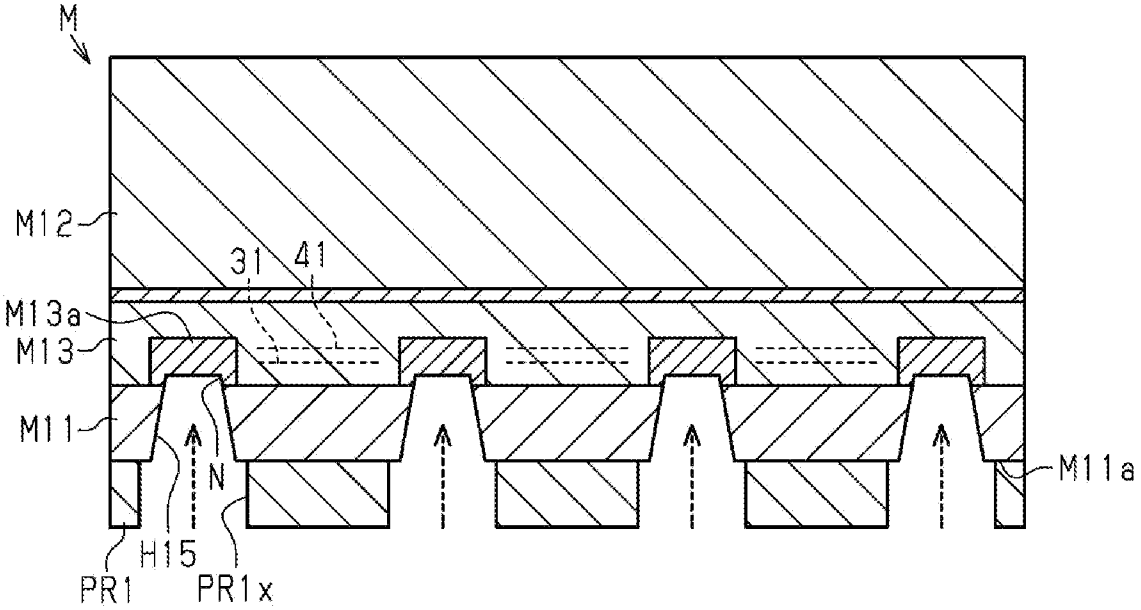
FIG. 11 is a view for illustrating the manufacturing method for the coil component according to the embodiment.

After that, as shown in FIG. 11, through-holes H15 are formed at positions to form the recesses 15*a*, 15*b*, 15*c*, 15*d* in the mother substrate M11 by, for example, sand blast via the openings PR1*x* of the photoresist PR1. At this time, cutout portions N may be formed in the conductor portions M13*a* at positions corresponding to the through-holes H15 in the mother multilayer body M13. The through-holes H15 may be formed by laser beam machining other than sand blast or may be formed by a combination of sand blast and laser beam machining.

Figure 12:
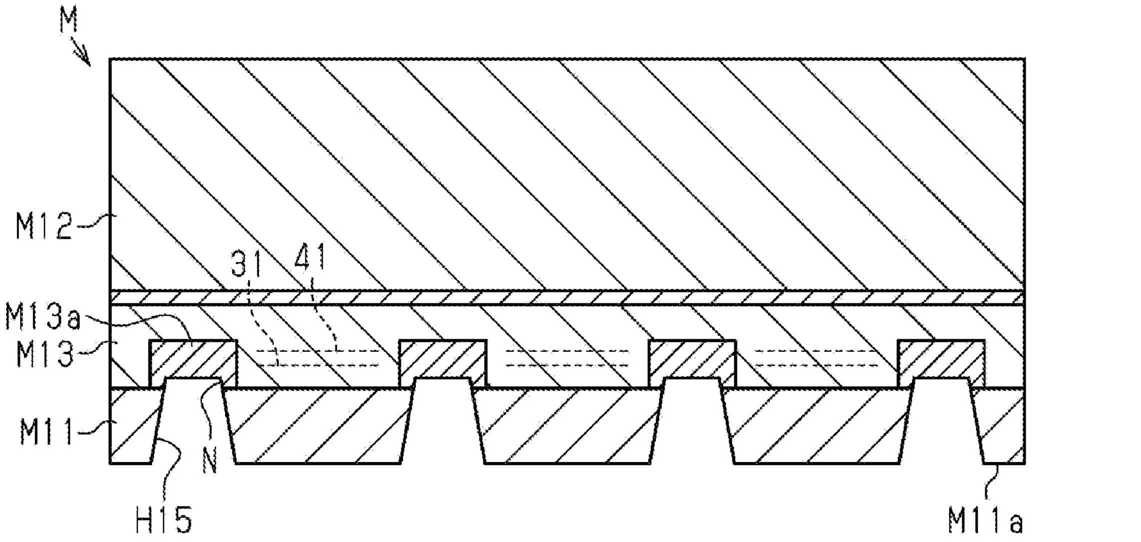
FIG. 12 is a view for illustrating the manufacturing method for the coil component according to the embodiment.

Then, as shown in FIG. 12, the photoresist PR1 is removed by using, for example, organic solvent.

Figure 13:
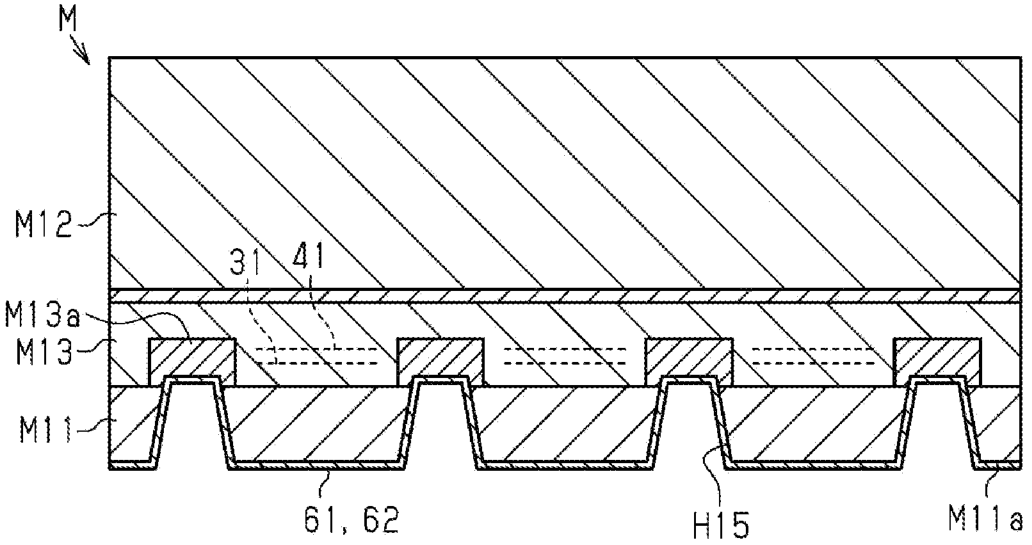
FIG. 13 is a view for illustrating the manufacturing method for the coil component according to the embodiment.

Subsequently, as shown in FIG. 13, the first metal layer 61 and the second metal layer 62 are deposited by sputtering on all the bottom surface M11*a* of the mother body M (mother substrate M11).

Figure 14:
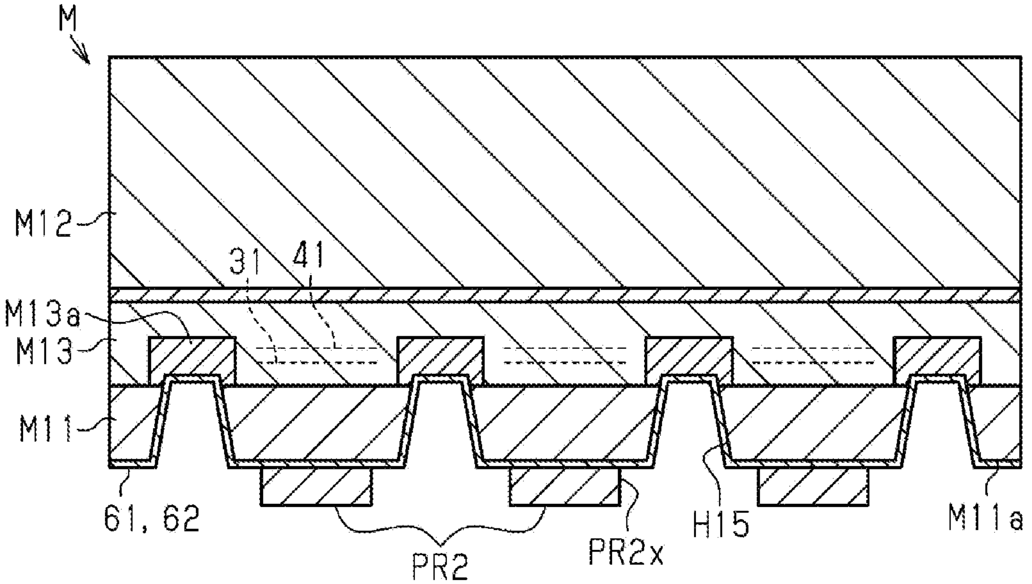
FIG. 14 is a view for illustrating the manufacturing method for the coil component according to the embodiment.

After that, as shown in FIG. 14, a photoresist PR2 is formed on a flat portion around the through-holes H15 of the bottom surface M11*a*. In other words, the photoresist PR2 has openings PR2*x* at positions corresponding to the through-holes H15.

Figure 15:
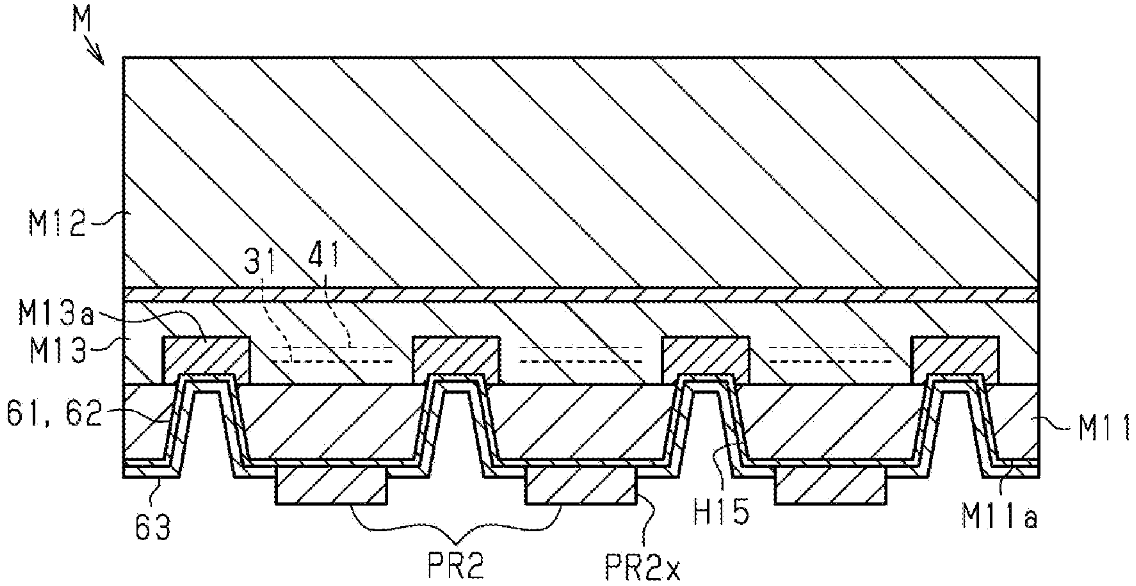
FIG. 15 is a view for illustrating the manufacturing method for the coil component according to the embodiment.

Then, as shown in FIG. 15, the third metal layers 63 are formed by electrolytic plating by using the first metal layer 61 and the second metal layer 62 as feeding films. At this time, the protruding portion 63*a* that extends along the short-side ridge portion 71 is formed in the third metal layer 63.

Figure 16:
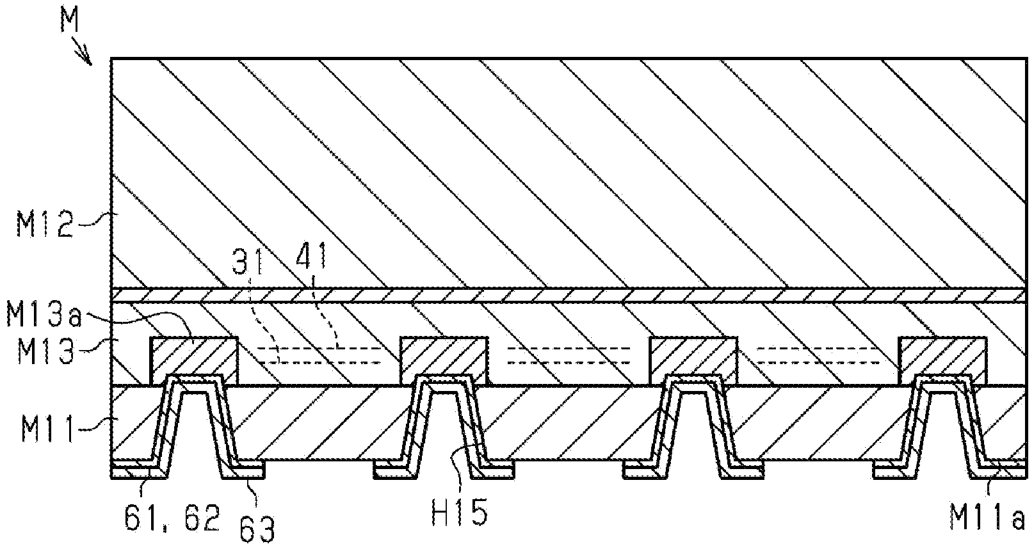
FIG. 16 is a view for illustrating the manufacturing method for the coil component according to the embodiment.

Subsequently, as shown in FIG. 16, the photoresist PR2 is removed by using organic solvent as in the case of the photoresist PR. Then, the first metal layer 61 and the second metal layer 62, exposed from the third metal layers 63, are removed by, for example, wet etching or the like.

Figure 17:
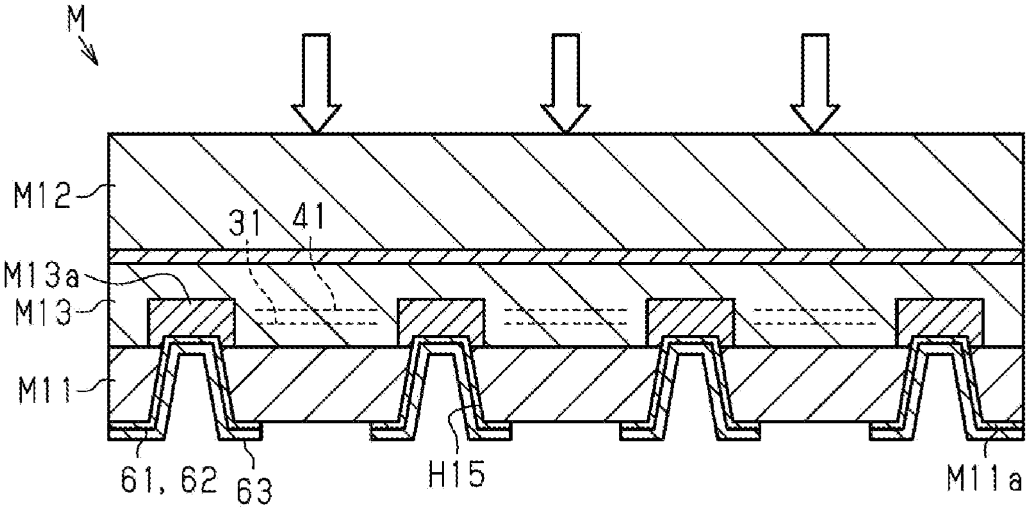
FIG. 17 is a view for illustrating the manufacturing method for the coil component according to the embodiment.

After that, as shown in FIG. 17, the mother substrate M12 is formed into a thin sheet shape by, for example, grinding or polishing.

Figure 18:
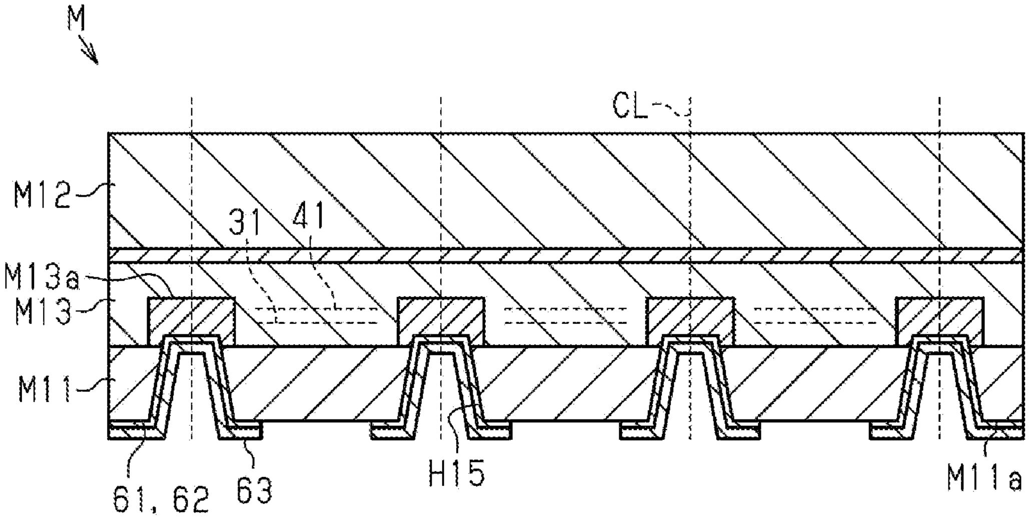
FIG. 18 is a view for illustrating the manufacturing method for the coil component according to the embodiment.

Then, as shown in FIG. 18, the mother body M is cut along cut lines CL into a size of each coil component 10. Thus, the conductor portions M13*a* of the mother multilayer body M13 become the extended portions 32 to 37, 42 to 46. After cutting, chamfering is performed by barrel polishing or the like.

Subsequently, the outer electrodes 14*a*, 14*b*, 14*c*, 14*d* are formed by forming the fourth metal layers 64 and the fifth metal layers 65 in this order by using electrolytic plating. As a result, the coil component 10 is finished. When the fourth metal layer 64 and the fifth metal layer 65 are formed, since the third metal layer 63 has the protruding portion 63*a* that extends along the short-side ridge portion 71 as described above, the fourth metal layer 64 and the fifth metal layer 65 similarly respectively have the protruding portions 64*a*, 65*a* that extend along the short-side ridge portion 71. With the protruding portions 64*a*, 65*a*, the contact of solder S with the first substrate 11 is reduced.

According to the above-described present embodiment, the following advantageous effects are obtained.

(1) When each electrode body portion 51 has the protruding portions 63*a*, 64*a*, 65*a* that extend along the short-side ridge portion 71 on the bottom surface 11*a*, the amount of entry of solder S is restricted by the protruding portions 63*a*, 64*a*, 65*a*, so a contact area between the first substrate 11 and solder S at each short-side ridge portion 71 is reduced. Thus, stress concentration that occurs at the recesses when high temperature treatment is performed in solder mounting process or the like is reduced, so it is possible to contribute to improvement in reliability.

Particularly, each protruding portion 63*a* extends along the short-side ridge portion 71 while being in contact with the short-side ridge portion 71 where stress easily concentrates, so it is possible to elongate the distance between the relatively close outer electrode 14*a* and outer electrode 14*b* and the distance between the relatively close outer electrode 14*c* and outer electrode 14*d* in the portions other than the protruding portions 63*a*, with the result that electrical insulation is ensured between the coil 22*a* and the coil 22*b*. In comparison with a configuration in which the protruding portions 63*a*, 64*a*, 65*a* are omitted, the surface areas of the outer electrodes 14*a*, 14*b*, 14*c*, 14*d* increase, so it is possible to enhance fixing force caused by solder S.

(2) Each protruding portion 63*a* is provided in the third metal layer 63, and each protruding portion 64*a* is provided in the fourth metal layer 64 provided so as to cover the third metal layer 63. In this way, by providing the protruding portion 63*a* in each third metal layer 63, the protruding portion 64*a* is also voluntarily formed in each fourth metal layer 64 formed by plating. Similarly, the protruding portion 65*a* is provided in each fifth metal layer 65 provided so as to cover the fourth metal layer 64. By providing the protruding portion 64*a* in each fourth metal layer 64, the protruding portion 65*a* is also voluntarily formed in each fifth metal layer 65 formed by plating.

(3) Each third metal layer 63 is a metal layer containing copper, and each fourth metal layer 64 is a metal layer containing nickel. The protruding portion 64*a* extends along the protruding portion 63*a* in each fourth metal layer 64 containing nickel, and a contact area between the first substrate 11 and solder S can be reduced by the fourth metal layer 64. Thus, stress concentration is reduced, so it is possible to contribute to improvement in reliability.

Other Embodiments

The above-described embodiment may be modified as follows. The above-described embodiment and the following modifications may be implemented in combination without any technical contradiction.

Figure 19:
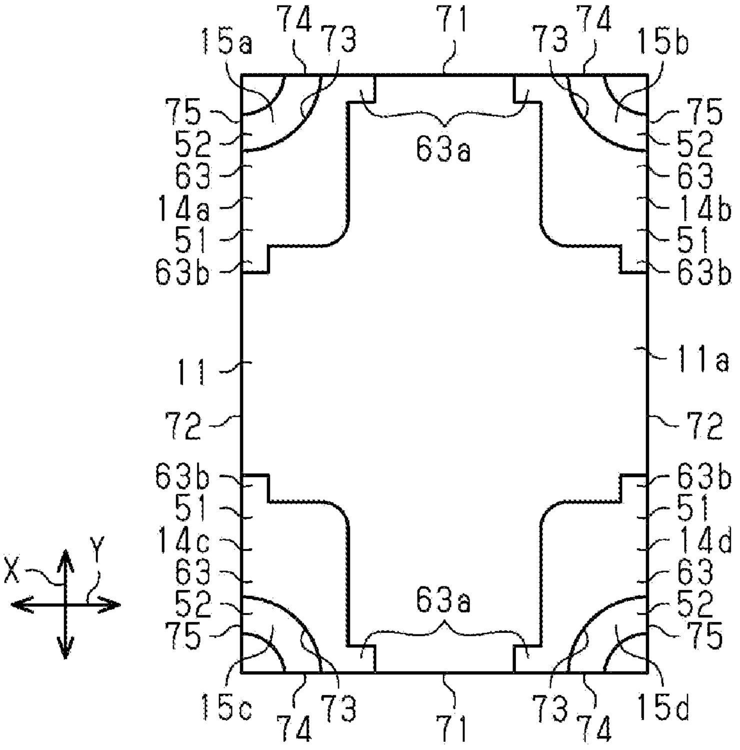
FIG. 19 is a plan view for illustrating third metal layers of outer electrodes of a coil component according to a modification.

As shown in FIG. 19, a configuration in which not only the protruding portions 63*a* but also long-side protruding portions 63*b* that respectively extend along the long-side ridge portions 72 on the bottom surface 11*a* are provided as protruding portions may be employed. By providing the long-side protruding portions 63*b* in this way, each fourth metal layer 64 and each fifth metal layer 65 outside each third metal layer 63 also similarly have long-side protruding portions. By providing the long-side protruding portions 63*b* in this way, a contact area between the first substrate 11 and solder S is reduced. Thus, it is possible to further suppress stress concentration. A configuration in which the protruding portions 63*a* are omitted and only the long-side protruding portions 63*b* are provided may be employed.

In the above-described embodiment, each of the outer electrodes 14*a*, 14*b*, 14*c*, 14*d* is made up of five metal layers 61, 62, 63, 64, 65; however, the configuration is not limited thereto. Alternatively, each of the outer electrodes 14*a*, 14*b*, 14*c*, 14*d* may be made up of four or less or six or more layers.

In the above-described embodiment, the recesses 15*a*, 15*b*, 15*c*, 15*d* are respectively provided at four corner portions; however, the configuration is not limited thereto. For example, a recess may be added to the center of the bottom surface 11*a* of the first substrate 11. Alternatively, another recess may be added between the recess 15*a* and the recess 15*c* or between the recess 15*b* and the recess 15*d*.

In the above-described embodiment, the coil component 10 includes four outer electrodes 14*a*, 14*b*, 14*c*, 14*d*; however, the configuration is not limited thereto. The coil component 10 may include six outer electrodes. In this case, an outer electrode is provided between the outer electrode 14*a* and the outer electrode 14*c* arranged in the long-side direction (X-axis direction) of the coil component 10, and an outer electrode is provided between the outer electrode 14*b* and the outer electrode 14*d* arranged in the long-side direction (X-axis direction) of the coil component 10.

In the above-described embodiment, the coil component 10 including a flat spiral coil conductor is employed; however, the configuration is not limited thereto. For example, a coil component may include a three-dimensional spiral (helical) coil conductor in which a spiral advances in the lamination direction D.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a magnetic substrate having a bottom surface having a substantially rectangular shape and having a pair of long sides and a pair of short sides, a top surface located across from the bottom surface in a first direction, and a plurality of side surfaces each connecting the bottom surface and the top surface, and the magnetic substrate having a recess at a corner portion of the bottom surface;

a multilayer body having an electrically insulating layer on the top surface and a coil in the multilayer body; and an outer electrode provided on the bottom surface, the outer electrode having an electrode body portion around the recess on the bottom surface, and the electrode body portion having a protruding portion extending along a ridge portion between the bottom surface and one of the side surfaces, wherein the protruding portion has a height smaller than a height of the recess in a direction perpendicular to the ridge portion when viewed in the first direction.

2. The coil component according to claim 1, wherein the protruding portion has a short-side protruding portion extending along the ridge portion at one of the short sides of the bottom surface.

3. The coil component according to claim 1, wherein the protruding portion has a long-side protruding portion extending along the ridge portion at one of the long sides of the bottom surface.

4. The coil component according to claim 1, wherein the electrode body portion is made up of a plurality of laminated metal layers, the plurality of metal layers includes a base layer located at an innermost side of the plurality of metal layers in a lamination direction of the multilayer body, and an outer metal layer located on the base layer, and the protruding portion is in the outer metal layer.

5. The coil component according to claim 4, wherein the outer metal layer includes a first outer metal layer containing copper and provided so as to cover the base layer, and a second outer metal layer containing nickel and configured to cover the first outer metal layer.

6. The coil component according to claim 5, wherein an elongation of the protruding portion in the second outer metal layer at the ridge portion is from 1/50 to 4/50 of a length of the ridge portion.

7. The coil component according to claim 5, wherein the protruding portion in the first outer metal layer is from 3 μm to 21 μm along the ridge portion.

8. The coil component according to claim 5, wherein the protruding portion in the second outer metal layer is from 6 μm to 25 μm along the ridge portion.

9. The coil component according to claim 2, wherein the protruding portion has a long-side protruding portion extending along the ridge portion at one of the long sides of the bottom surface.

10. The coil component according to claim 2, wherein the electrode body portion is made up of a plurality of laminated metal layers, the plurality of metal layers includes a base layer located at an innermost side of the plurality of metal layers in a lamination direction of the multilayer body, and an outer metal layer located on the base layer, and the protruding portion is in the outer metal layer.

11. The coil component according to claim 3, wherein the electrode body portion is made up of a plurality of laminated metal layers, the plurality of metal layers includes a base layer located at an innermost side of the plurality of metal layers in a lamination direction of the multilayer body, and an outer metal layer located on the base layer, and the protruding portion is in the outer metal layer.

12. The coil component according to claim 9, wherein the electrode body portion is made up of a plurality of laminated metal layers, the plurality of metal layers includes a base layer located at an innermost side of the plurality of metal layers in a lamination direction of the multilayer body, and an outer metal layer located on the base layer, and the protruding portion is in the outer metal layer.

13. The coil component according to claim 10, wherein the outer metal layer includes a first outer metal layer containing copper and provided so as to cover the base layer, and a second outer metal layer containing nickel and configured to cover the first outer metal layer.

14. The coil component according to claim 11, wherein the outer metal layer includes a first outer metal layer containing copper and provided so as to cover the base layer, and a second outer metal layer containing nickel and configured to cover the first outer metal layer.

15. The coil component according to claim 12, wherein the outer metal layer includes a first outer metal layer containing copper and provided so as to cover the base layer, and a second outer metal layer containing nickel and configured to cover the first outer metal layer.

16. The coil component according to claim 13, wherein an elongation of the protruding portion in the second outer metal layer at the ridge portion is from 1/50 to 4/50 of a length of the ridge portion.

17. The coil component according to claim 14, wherein an elongation of the protruding portion in the second outer metal layer at the ridge portion is from 1/50 to 4/50 of a length of the ridge portion.

18. The coil component according to claim 6, wherein the protruding portion in the first outer metal layer is from 3 μm to 21 μm along the ridge portion.

19. The coil component according to claim 6, wherein the protruding portion in the second outer metal layer is from 6 μm to 25 μm along the ridge portion.

20. The coil component according to claim 7, wherein the protruding portion in the second outer metal layer is from 6 μm to 25 μm along the ridge portion.

21. A coil component comprising:

a magnetic substrate having a bottom surface having a substantially rectangular shape and having a pair of long sides and a pair of short sides, a top surface located across from the bottom surface in a first direction, and a plurality of side surfaces each connecting the bottom surface and the top surface, and the magnetic substrate having a recess at a corner portion of the bottom surface;

a multilayer body having an electrically insulating layer on the top surface and a coil in the multilayer body; and an outer electrode provided on the bottom surface, the outer electrode having an electrode body portion around the recess on the bottom surface, and the electrode body portion having a main portion and a protruding portion extending from the main portion along a ridge portion between the bottom surface and one of the side surfaces, wherein the main portion has a width larger than a width of the recess in a second direction in which the ridge portion extends and a height larger than a height of the recess in a third direction perpendicular to the second direction when viewed in the first direction, and the protruding portion has a height smaller than the height of the main portion in the third direction.

* * * * *